(12) United States Patent
Rejniak et al.

(10) Patent No.: US 10,253,515 B2
(45) Date of Patent: Apr. 9, 2019

(54) SYSTEM AND METHODS FOR POOL AND SPA FILTER CLEANING

(71) Applicants: Brian Rosser Rejniak, Yorba Linda, CA (US); John Alan Rejniak, Corona, CA (US)

(72) Inventors: Brian Rosser Rejniak, Yorba Linda, CA (US); John Alan Rejniak, Corona, CA (US)

(*) Notice: Subject to any disclaimer, the term of this patent is extended or adjusted under 35 U.S.C. 154(b) by 29 days.

(21) Appl. No.: 15/498,256

(22) Filed: Apr. 26, 2017

(65) Prior Publication Data
US 2017/0284115 A1 Oct. 5, 2017

(51) Int. Cl.
| | |
|---|---|
| *E04H 4/12* | (2006.01) |
| *B01D 29/64* | (2006.01) |
| *B01D 29/11* | (2006.01) |
| *B01D 29/52* | (2006.01) |
| *B08B 9/00* | (2006.01) |

(52) U.S. Cl.
CPC ......... *E04H 4/1209* (2013.01); *B01D 29/114* (2013.01); *B01D 29/52* (2013.01); *B01D 29/6438* (2013.01); *B01D 29/6446* (2013.01); *B08B 9/00* (2013.01); *B08B 2203/02* (2013.01)

(58) Field of Classification Search
CPC .. E04H 4/1209; B01D 29/6446; B01D 29/52; B01D 29/114; B01D 29/6438; B08B 9/00; B08B 2203/02
USPC ......... 210/167.14; 134/157, 158, 159, 166 R
See application file for complete search history.

(56) References Cited

U.S. PATENT DOCUMENTS

| | | | | |
|---|---|---|---|---|
| 3,107,987 | A * | 10/1963 | Duer ...................... | B01D 46/26 415/121.2 |
| 6,156,213 | A | 12/2000 | Dudley et al. | |
| 2002/0166578 | A1* | 11/2002 | Leblond ............... | A46B 13/001 134/99.2 |
| 2004/0200770 | A1* | 10/2004 | Clary .................... | B01D 29/21 210/391 |
| 2014/0326656 | A1* | 11/2014 | Greenfield ............ | B01D 29/68 210/460 |

* cited by examiner

*Primary Examiner* — Fred Prince
(74) *Attorney, Agent, or Firm* — CIONCA IP Law P.C.; Marin Cionca

(57) ABSTRACT

A self-cleaning pool or spa filter system having a filter body housing a set of filter cartridges, each filter cartridge rotatably connected to a filter holder, a spray manifold having an inlet for receiving water from a pump and a plurality of sprayers, a shaft connected to the filter holder and a motor, which can rotate the shaft and thus the filter holder, causing the set of filter cartridges to rotate about the shaft, exposing lengthwise each filter cartridge to the sprayers; a sun gear attached to the first shaft; and a set of planet gears, each planet gear being concentrically associated with one filter cartridge and engaged by the sun gear, causing transfer of a rotational movement of the sun gear to each planet gear and to each filter cartridge, causing each filter cartridge to rotate, exposing the entire circumference of each filter cartridge to the plurality of sprayers.

20 Claims, 15 Drawing Sheets

<DENOTES PRESSING A CONTROL PANEL BUTTON>

SYSTEM AND METHODS FOR POOL AND SPA FILTER CLEANING

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF INVENTION

1. Field of the Invention

The invention relates generally to pool and spa maintenance, and more specifically to pool and spa filter cleaning.

2. Description of the Related Art

Swimming pool or spa filters may need to be cleaned periodically, and this process can be difficult for users. These filters may be filter grids, which may include standard grid filters or diatomaceous earth (D.E.) filters inside of a pool or spa filter body, for example. To clean a swimming pool or spa filter, it may be required to disassemble the filter body, by removing the top section, removing the filter grids and cleaning each filter, such as with a garden hose. This process can be difficult and time-consuming for users, sometimes taking up to one hour. Reassembling the filter such that there are no leaks from the top to bottom band and the O-ring assembly may also be difficult for users. This process may also be costly; for example, it may cost approximately $90 twice yearly to clean the filters. Therefore, there is a need for a solution to these problems.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a self-cleaning pool or spa filter system is provided, having a filter including a filter body housing a first set of filter cartridges, each filter cartridge having a length and a circumference, each filter cartridge being rotatably connected to a filter holder via a filter mount; a spray manifold having an inlet for receiving water from a pool or spa pump and a plurality of sprayers being disposed inside the filter body lengthwise about the first set filter cartridges; a first shaft connected to the filter holder, the first shaft being also connected to a first motor, which when actuated, can rotate the first shaft and thus the filter holder, causing the first set of filter cartridges to rotate about the first shaft, thus exposing successively lengthwise each filter cartridge of the first set to the plurality of sprayers; a sun gear attached to the first shaft; and a second set of planet gears, each planet gear being concentrically associated with one filter cartridge and being engaged by the sun gear, such that to cause transfer of a rotational movement of the sun gear simultaneously to each planet gear of the second set and thus to each filter cartridge, causing each filter cartridge to rotate about own filter mount, for exposing the entire circumference of each filter cartridge of the first set to the plurality of sprayers during the first shaft's rotation.

Thus, an advantage may be that the filters of a liquid circulation system are automatically cleaned without the need for a user to manually remove and clean the filters.

In another aspect, a self-cleaning filter system is provided, having a control module configured to automate a cleaning process. The cleaning process may include the steps of opening a solenoid valve mounted on the filter body to equalize a pressure inside the filter with atmospheric pressure; actuating a second motor to turn the rotatable valve shaft from the normal position to the cleaning position; starting the drain pump; starting the pool or spa pump, and thus the plurality of sprayers; actuating the first motor to rotate the first shaft and thus the first set of filter cartridges and each filter cartridge; after a preset time, turning off the pool or spa pump, and thus the plurality of sprayers; closing the solenoid valve; turning off the drain pump; and actuating the second motor to turn the rotatable valve shaft from the cleaning position to the normal position.

Thus, an advantage may be that the cleaning of a swimming pool or spa filters may be automated by a control module without the need for user interaction.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figures 1A, 1B:
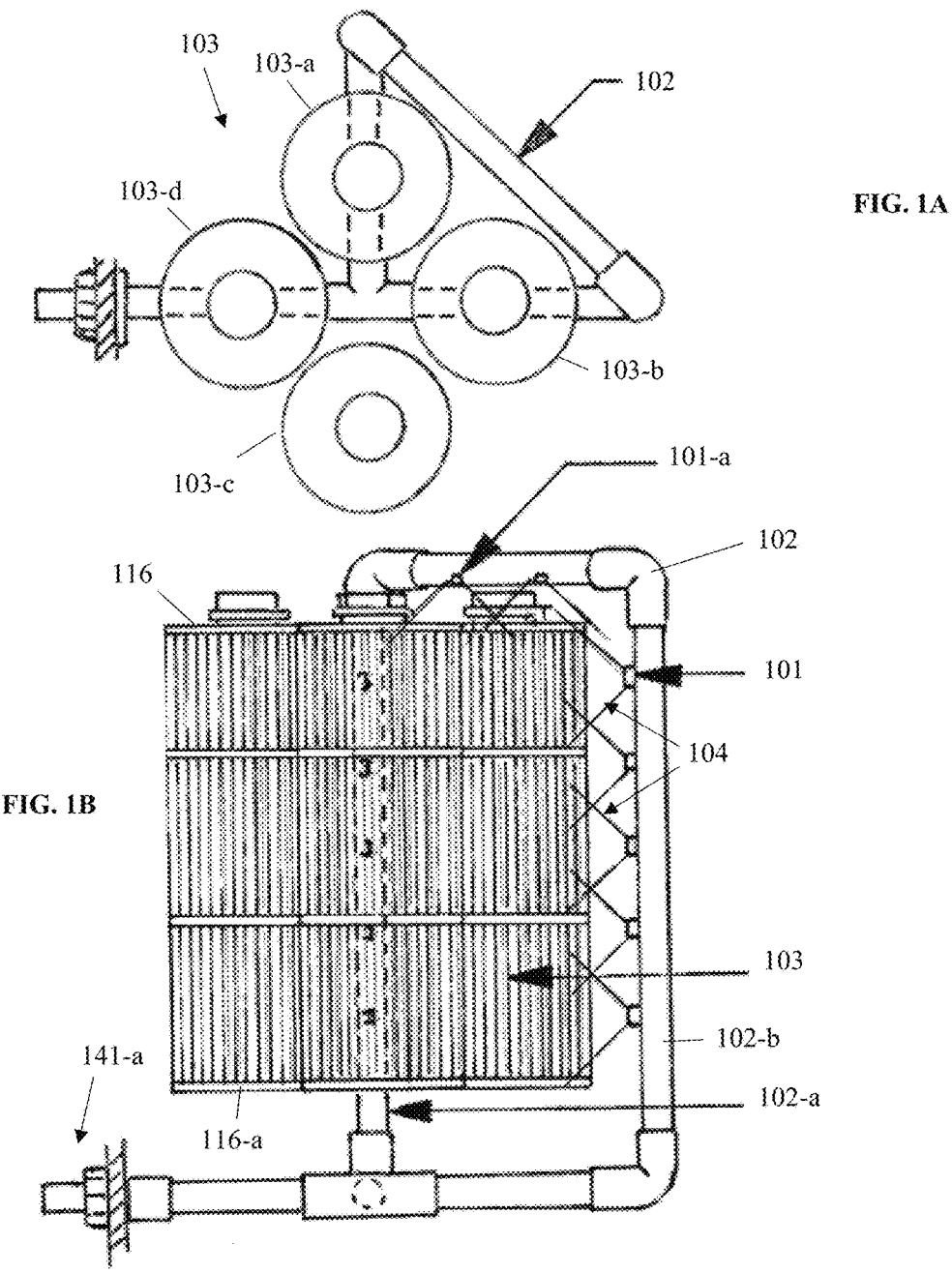
FIG. 1A illustrates the top view of an example of a plumbing scheme for a filter array and a spray manifold for a smart filter system, according to an aspect.
FIG. 1B illustrates the side view of an example of a plumbing scheme for the sprayers of a smart filter system, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

For the following description, it can be assumed that most correspondingly labeled elements across the figures (e.g., 103 and 203, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1A illustrates the top view of an example of a plumbing scheme for a filter array 103 and a spray manifold 102 for a self-cleaning smart filter system, according to an aspect. An automated smart filter system may be used in order to detect the need for filter cleaning and to automate the cleaning of filters used in any liquid circulation system, such as, for example, a swimming pool or spa system. An automated smart filter system may eliminate the need for a user to remove filters from a filter body housing for cleaning. A top view of a quad filter array 103 is shown, as an example of filters used in a liquid circulation system that may be cleaned using the smart filter system. As an example, a filter array 103 may include a set of filter cartridges, each filter having a length and a circumference. As an example, the filter array 103 may include four individual filter cartridges 103-a, 103-b, 103-c, and 103-d which may be used for filtering water in a swimming pool or spa, and may be cleaned using the smart filter system. As used herein, "filter cartridge" may refer to any individual filter used in a filter array. A spray manifold 102 is shown, as an example of a possible configuration for the plurality of sprayers provided with the smart filter.

FIG. 1B illustrates the side view of an example of a plumbing scheme for the sprayers 101 of a smart filter system, according to an aspect. A plurality of sprayers 101 may be provided on the spray manifold 102. The sprayers 101 may be high pressure type, ¼-inch National Pipe Thread (NPT) standard, and may be drilled and tapped into the spray manifold 102, which may, for example, be constructed from vertical PVC. The PVC may for example be schedule 40 pipe. The spray manifold may include an inlet 141-a for receiving water from the swimming or spa, which may be directed to the sprayers 101 for cleaning the filter array 103. The filter array 103 may be connected to a filter holder, which may be of any suitable shape. As an example, the filter holder may be in two parts, a top filter holder 116 and a bottom filter holder 116-a. The filter array 103 may be able to rotate during the cleaning process, as will be discussed further when referring to FIGS. 2A-2C. High pressure sprayers 101 may be suitable due to their unique vertical V-shaped spray pattern 104. The top pipe may be adapted to be a flexible type to fit the contour of the filter body. As another example of a configuration for the spray manifold 102, a single vertical sprayer pipe may be used in the middle of the quad filter array 103. As another example, a two-sided configuration as shown may be used, having a back side pipe 102-a with sprayers and a front side pipe 102-b with sprayers. A vertical configuration such as the vertical pipe 102-b as shown may have staggered sprayers, such that the plurality of V-shaped sprays of water 104 overlap, and complete overlapping coverage from the top to bottom of each filter grid is ensured. The placement of the sprayers 101 may also be staggered between the front side pipe 102-b and the back side pipe 102-a, such that a full coverage of water onto the filter array 103 is ensured. Overhead top sprayers 101-a may also be used. As an example, D.E. filter grids 103 may be fully cleaned in two revolutions of each filter. During the cleaning, the dirty waste water may simultaneously be discharging through an open drain port (as shown by 420 in FIGS. 4A-4B). As an example, the installation of the vertical spray pipes may be as follows: using one inch (1" trade size), schedule 40 PVC for the spray manifold 102, which may have enough rigidity for a long lasting, mechanically sound installation, and all sprayer plumbing and sprayers internally mounted inside of the filter body ("filter body," "filter body housing," or "filter housing," shown as 921 in FIG. 9).

Figure 2A:
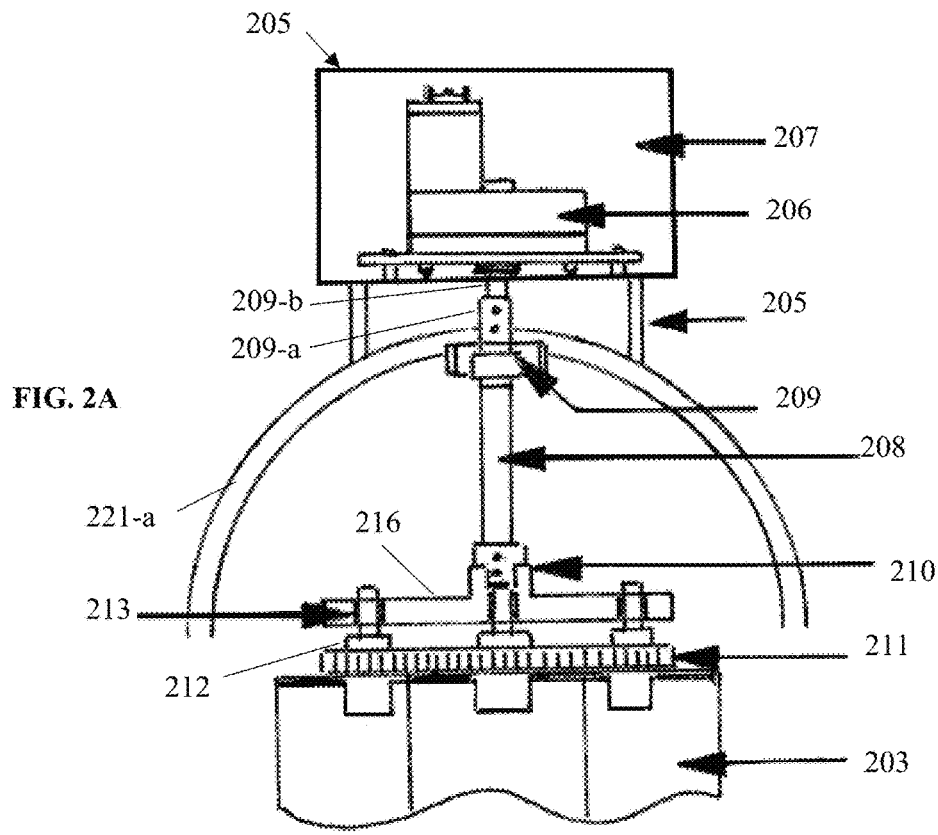
FIG. 2A illustrates a side view of the filter drive system, according to an aspect.
Figure 9:
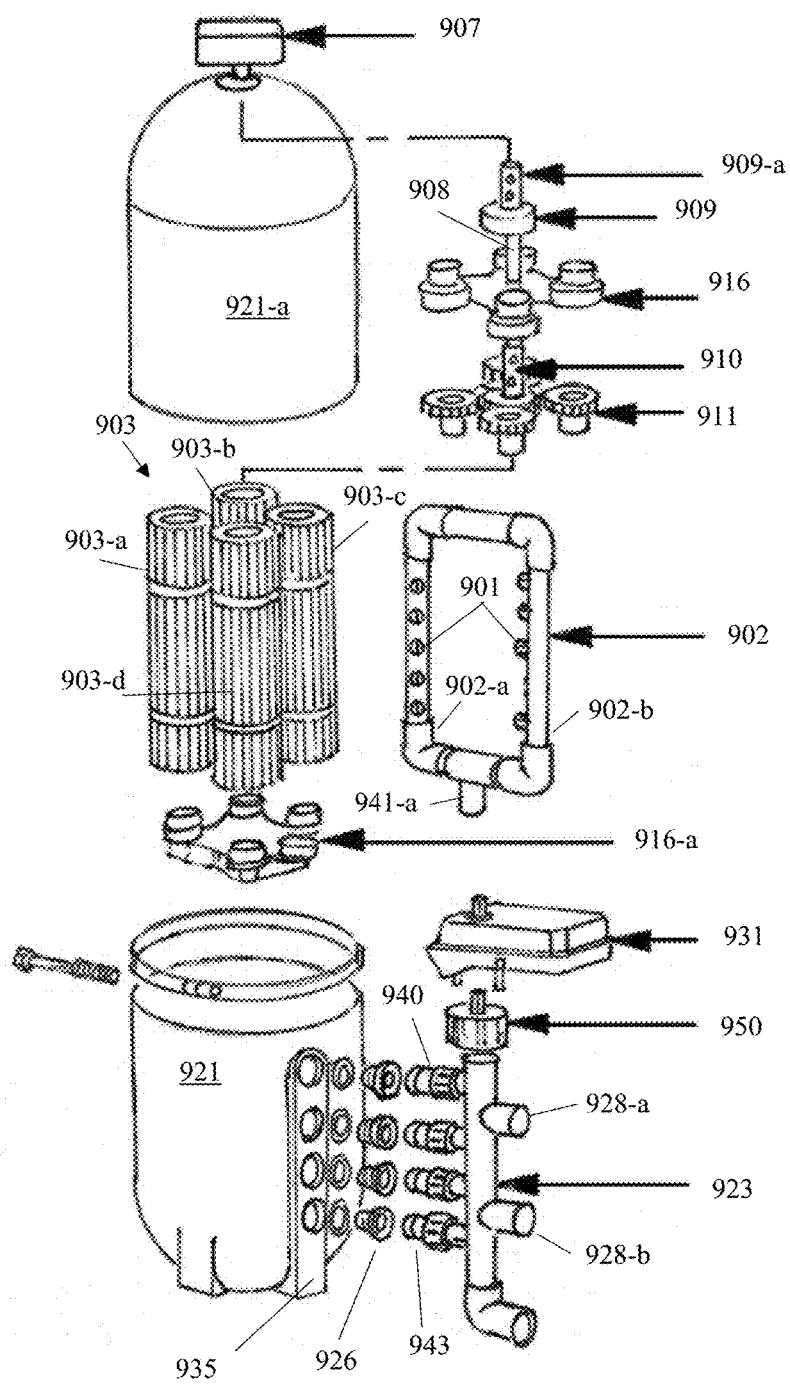
FIG. 9 illustrates the exploded view of the smart filter system for cleaning a filter array of a liquid circulation system, according to an aspect.

FIG. 2A illustrates a side view of the filter drive system 205, according to an aspect. A low voltage, high torque DC low RPM motor or gearmotor 206 (for example, 4 RPM, and may also for example include a gear reducer) may be used for the drive system 205. The gearmotor may be a DC motor of 12-24 volts DC, or an AC motor, typically powered by 120 volts AC with GFCI (Ground Fault Circuit Interrupter protection). As an example, a non-metallic type enclosure 207 may house the DC motor 206, motor DC power supply (not shown), and the control panel (as shown by 1025 in FIG. 10A). The enclosure 207 may be mounted onto the top of a filter body cover 221-*a*, such as, for example, by using a stand 237 or any other suitable securing means. The filter body cover 221-*a* may then fit over and cover the filter array 203, which may sit within a filter body (as shown in FIG. 9). The motor 206 may be equipped with a drive motor shaft 209-*b*, which may connect into, for example, a shaft coupling 209-*a* through a ball bearing and a shaft seal 209 through which a drive shaft 208 may pass through. The drive shaft 208 may be attached to a spider coupling ("spider coupling," or "Lovejoy coupling") 210, or any other suitable type of coupling. As an example, the spider coupling may be produced by Lovejoy, Inc. The spider coupling 210 may be associated with a spur gear array 211, for example, and the spur gear array 211 may be associated with the filters, such as a quad filter array 203 as shown. A filter holder 212 ("filter holder" or "filter mount") may be used to associated the filters with the motor, and may comprise separate components such as a top filter holder and a bottom filter holder. A shaft with sleeve bearings 213 may be fitted onto the top 216 of the filter holder. As another example of how filters may be associated with the motor 206, the original top filter holder of the swimming pool or spa system may be modified or installed with a rotating plate attached to the spur gear array 211.

Figure 2B:
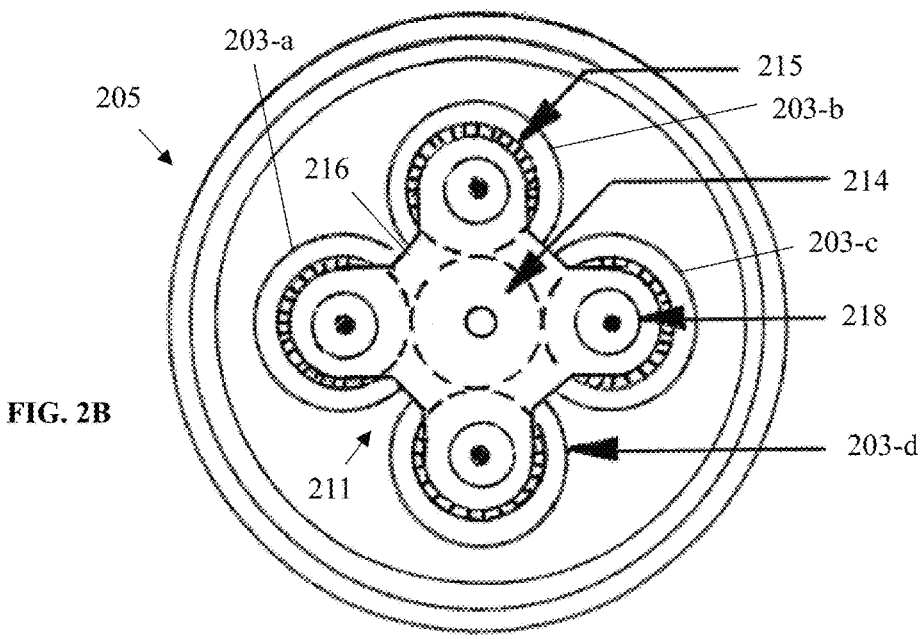
FIG. 2B illustrates a top view of the filter drive system, according to an aspect.

FIG. 2B illustrates a top view of the filter drive system 205, according to an aspect. As shown, a filter array 203 may be a quad array, which may comprise a set of filter cartridges. As an example, the set of filter cartridges may be four individual filters cartridges ("filter" or "filter cartridge") 203-*a*, 203-*b*, 203-*c*, and 203-*d*. Each of the filter cartridges 203-*a*-203-*d* may be rotatably connected to a filter holder via a filter mount, such as a top filter holder and a bottom filter holder (as shown in FIG. 1B). The filter drive system may also include a first shaft connected to the filter holder 212, the first shaft also being connected to the motor 206. When the motor 206 is actuated, the shaft connected to the motor may rotate, thus rotating the filter holder 212, which may cause the set of filter cartridges to rotate about the first shaft, thus exposing successively lengthwise each filter cartridge of the first set to the plurality of sprayers.

As an example, a sun and planet gear system may be used with the filter holders for the rotation of the filters 203, with, for example, four planet gears 215. A sun gear 214 may be attached to the first shaft 208 and may be fixed to a coupling, such as, for example, a spider coupling 210, and may also be fixed to the top filter holder 216. A set of planet gears may also be provided. Each planet gear 215 may be concentrically associated with one filter cartridge as shown, and may be engaged by the sun gear 214, and may turn when the sun gear 214 is turned by the motor and shaft 208, thus rotating the top and bottom filter holders. This may cause transfer of rotational movement of the sun gear 214 simultaneously to each planet gear 215 of the set of gear array 211, and thus to each filter cartridge 203-*a*-203-*d*, causing each filter cartridge to rotate about its own filter mount 212, for complete coverage of the water from the sprayers. Thus, the entire circumference of each filter cartridge may be exposed to the water from the sprayers during the rotation of the shaft 208.

Each filter cartridge 203-*a*-203-*d* in a filter array 203 may include a filter opening 218, which may go through the filter 203-*a* longitudinally, for example, at the center of the filter. The filter opening 218 may be capped at the top of the filter by any suitable means, which may prevent D.E. from leaking and entering the pool or spa circulation process.

Figure 2C:
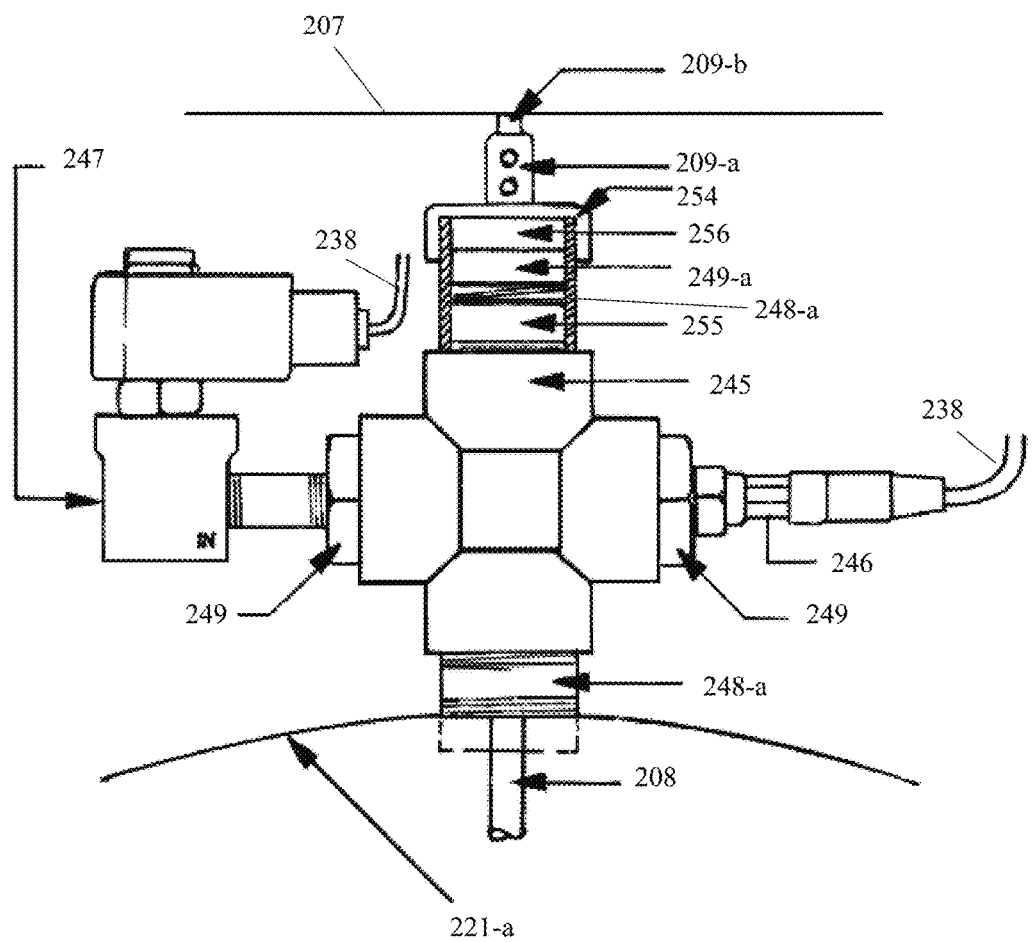
FIG. 2C illustrates another example of the enclosure 207 for the filter drive system and its association with the filter body cover 221-a by a threaded cross 245, according to an aspect.

FIG. 2C illustrates another example of the enclosure 207 for the filter drive system and its association with the filter body cover 221-*a* by a threaded cross 245, according to an aspect. As an example, a threaded cross 245 may be used to connect the enclosure 207 and the filter body cover 221 as well as other components, such as, for example, a transducer 246, and a solenoid valve 247, or any similar accessories. The solenoid valve 247 may be used to discharge air out to the atmosphere during the cleaning cycle of the smart filter system. Accessories such as the transducer 246 and the solenoid valve 247 may be powered by, for example, a power cord 238. The solenoid valve 247 may be used for equalizing the pressure inside of the filter body with the atmospheric pressure, thus preventing a vacuum from being created within the filter body, and to ensure that pumping out of the water inside of the filter body can be properly carried out. The threaded cross 245 may, for example, be non-metallic, and may be a thick-wall 1-inch National Pipe Thread (NPT) threaded cross, having four openings for receiving accessories. Reducing bushings 249 may be used for mounting and associating components such as the transducer 246 and solenoid valve 247 with the threaded cross. A pipe fitting 248-*a* such as a 1-inch NPT close nipple may be used for fitting and associating the threaded cross 245 with the filter body cover 221-*a*. A similar NPT close nipple 248-*a* may be used at the top of the threaded cross 245. The nipple 248-*a* may be threaded and may fit the drive shaft bearing 256, drive shaft seal assembly 255, and the threaded top cap 254. As an example, the enclosure 207 may be associated with the threaded cross 245 by a drive motor shaft 209-*b*, fitted into a shaft coupling 209-*a* associated with a cap 254. The cap 254 may be fitted over a spring-loaded seal 255 mounted into the threaded cross 245 and secured by a sealed bearing 256 and a bushing 249-*a*.

Figure 3:
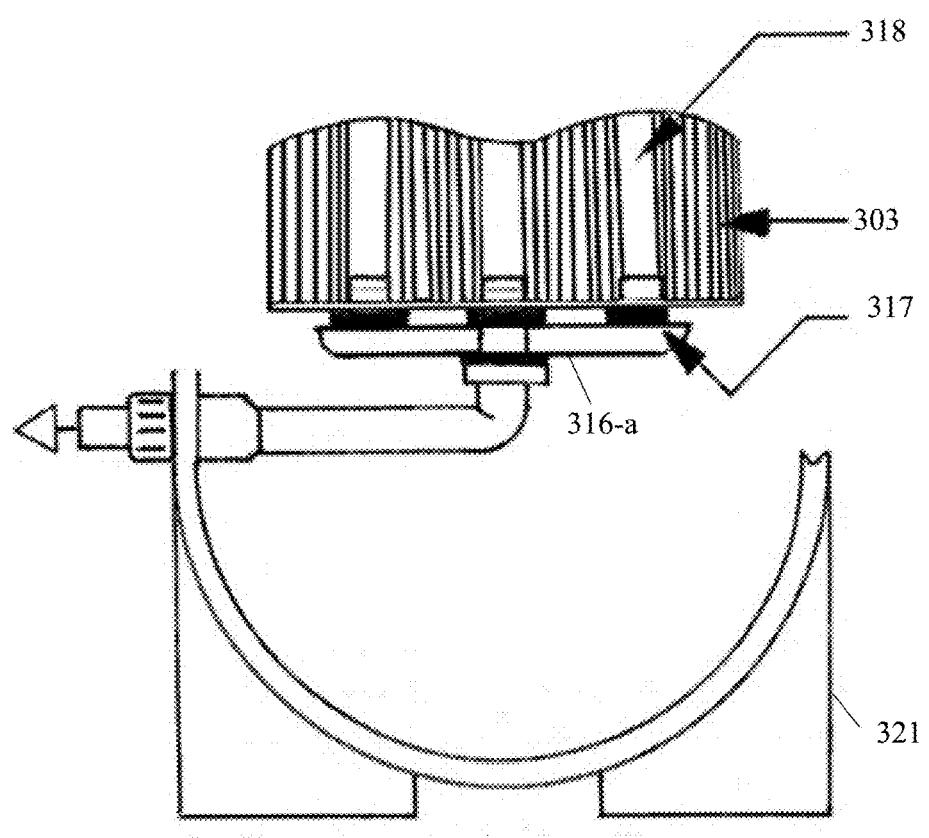
FIG. 3 illustrates a side sectional view of the bottom of a filter mount and a partial sectional view of a filter array inside of a filter body, according to an aspect.

FIG. 3 illustrates a side sectional view of the bottom of a filter mount 316-*a* and a partial sectional view of a filter array 303 inside of a filter body 321, according to an aspect. Again, the filter array 303 may be held by a top filter holder (as shown by 216 in FIG. 2A) and a bottom filter holder 316-*a*. The bottom filter holder 316-*a* may provide a platform for holding the filter grids in place with a non-metallic or non-metallic and stainless steel flat sleeve bearings 317, which may help to facilitate the rotational movement of the individual filter grids.

Figure 4A:
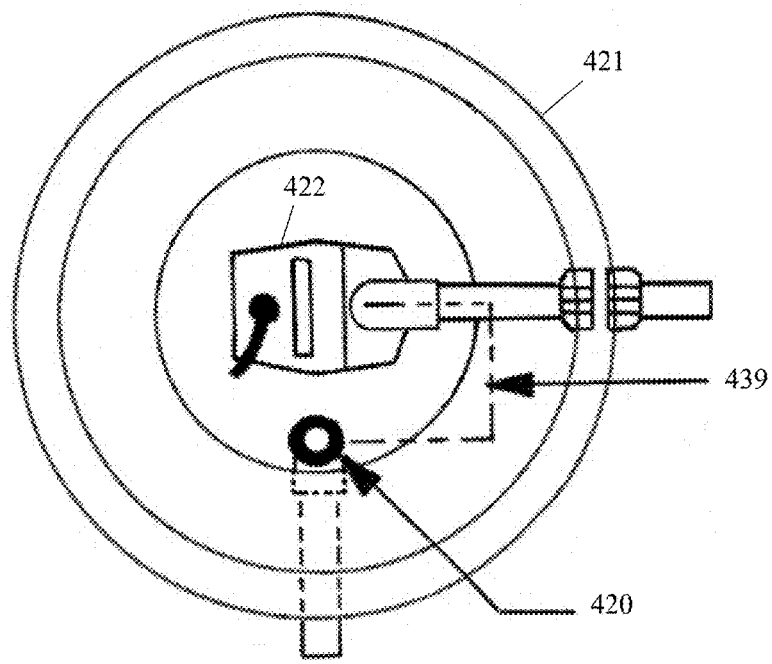
FIG. 4A illustrates the top view of the internal drain-sump pump inside of a filter body, according to an aspect.

FIG. 4A illustrates the top view of the internal drain-sump pump 422 inside of a filter body 421, according to an aspect. The drain-sump pump 422 may be a key component of the process of cleaning the filters, by efficiently draining the filter body 421 of water, such that the filters being cleaned are not submerged in dirty waste water during the cleaning cycle. In order to remove waste water from the swimming pool or spa system, the drain-sump pump 422 may be connected to the bottom of the filter body 421 and also to a sewer line. An advantage of using a drain-sump pump 422 in place of a simple drain port may be that the water being pumped into the filter body 421 may be entering in faster than it is drained out, without a drain sump pump 422. Thus, the drain-sump pump 422 may assist in quickly removing the dirty waste water.

As an example, when a filter cleaning cycle is initiated, the drain-sump pump 422 may be configured to start to drain the filter body before the sprayers start with a time delay, to ensure the filter is drained of all or substantially all filter body water before the sprayers start. This would ensure for example that the sprayed water can reach and clean the filter cartridges. In an example, the drain-sump pump stays on and discharges dirty water continuously during the duration of the cleaning cycle at a suitable rate that prevents submersion of the filter cartridges into the dirty waste water. This is an important advantage of using a drain pump 422 over just letting the dirty waste water drain naturally under the influence of gravity. The natural draining may not keep up with the sprayers and cause submersion of the filter cartridges into the dirty waste water, defeating or impeding the cleaning process. Another time delay may be provided to allow the drain pump 422 to continue running for a suitable amount of time necessary after the sprayers stop, to empty the filter body of dirty waste water. No dirty waste water should be within the filter body when the cleaning cycle is completed. The sprayer start time delay at the beginning and the drain pump stop delay at the end of the cleaning cycle may be, for example, thirty seconds or one minute, as necessary to achieve the goals stated herein. The plumbing may be routed for example to a bottom drain 420, via plumbing represented by 439.

As one example of a plumbing option, the pump 422 may be housed inside of the filter body 421. An internal drain-sump pump 422 may be mounted at the bottom of the filter body 421, as an example (as shown from a side view in FIG. 4B). The pump 422 may be totally immersed during use, and, again, may pump dirty water and waste water out during the cleaning process, down to ⅛-inch, for example. Waste water may be plumbed to a sewer line, which may be installed with swimming pool and spa equipment. Smaller and more compact drain-sump pumps may also be used, but these may have a lower flow rate than a larger model. The bottom drain 420 may be configured to accommodate a union fitting, for example, for fitting the drain-sump pump with the port of a drain. As an example, the drain-sump pump 422 may have a union connection or any other standard connection for easy removal if maintenance or replacement is needed. Other suitable plumbing options may also be used, such as the example discussed when referring to FIGS. 5A-5C.

Figure 4B:
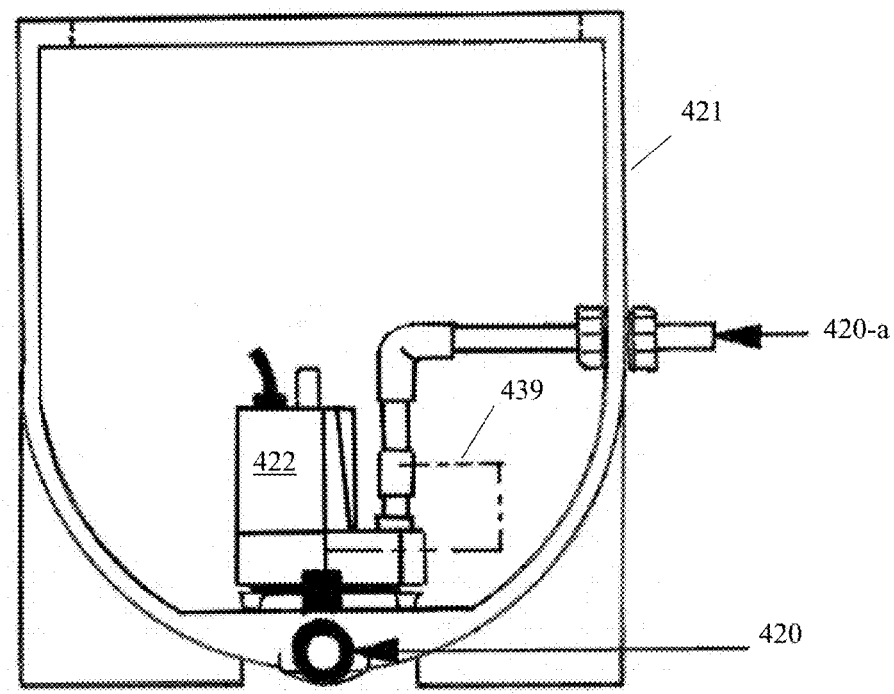
FIG. 4B illustrates the side cutaway view of the internal drain-sump pump housed inside of the filter body, according to an aspect.

FIG. 4B illustrates the side cutaway view of the internal drain-sump pump housed inside of the filter body 421, according to an aspect. As another example, a side drain 420-a may also be used for waste water, or a bottom drain 420, or a side drain 420-a and a bottom drain 420 may be used together. The system may also include additional plumbing 439 for routing flow to the bottom drain 420.

Figure 5A:
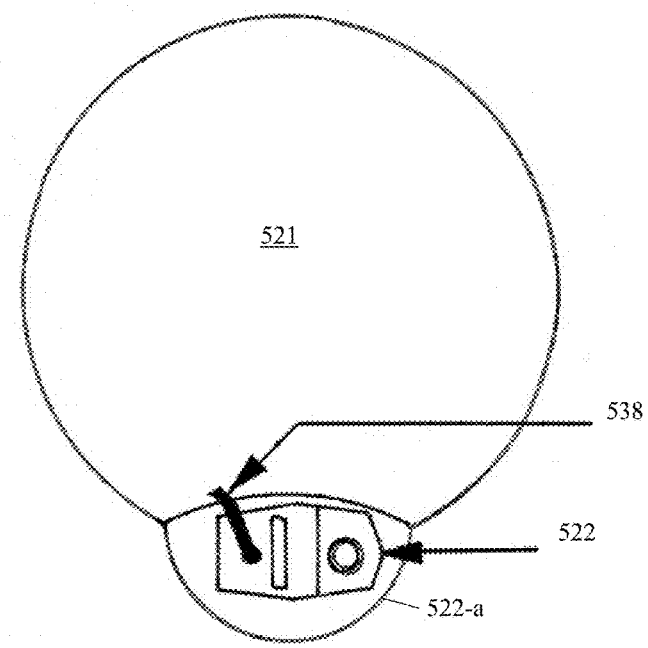
FIG. 5A illustrates the top cutaway view of a filter housing dome with an offset internal drain-sump pump, according to an aspect.

FIG. 5A illustrates the top cutaway view of a filter housing dome 521 with an offset internal drain-sump pump 522, according to an aspect. As another plumbing option, the pump 522 may be housed away from the filter body 521, and may be housed in its own pump dome 522-a. The pump dome 522-a may be molded to fit around and be open to the filter body 521, such that the housed components are accessible for easy maintenance or removal. If a plumbing system is used in which the filter grids, plumbing, or other components are in close proximity to the bottom of the filter body such that an internal drain-sump cannot be installed into the bottom of the filter body as in FIG. 4B, an option may be to use an offset dome 522-a to house the pump to the side. The pump 522 may be powered using a power cord 538 for example, which may be as an example 10 feet in length. The domes 521 and 522 may include holes (not shown) for the power cord 538.

Figures 5B, 5C:
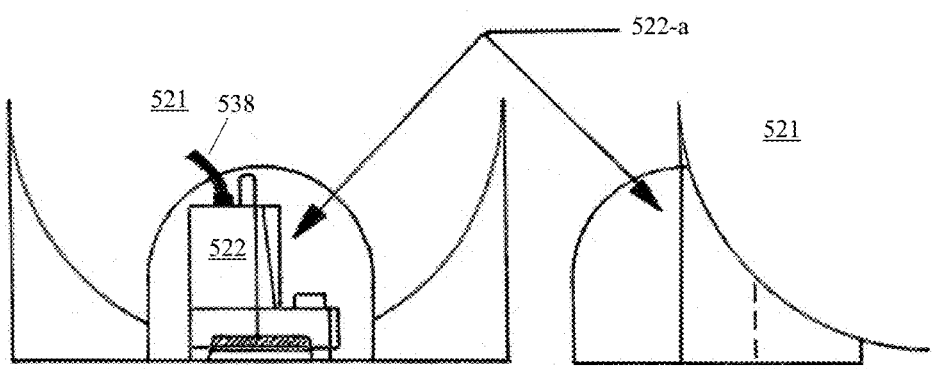
FIGS. 5B-5C illustrate a front cutaway view and a right side view, respectively, of an internal drain-sump pump, offset from the filter dome, according to an aspect.

FIGS. 5B-5C illustrate a front cutaway view and a right side view, respectively, of an internal drain-sump pump 522, offset from the filter dome 521, according to an aspect. As an example, the offset pump 522 may be housed inside of a pump dome 522-a offset from and attached to the filter dome 521. Again, a power cord 538 may be used for the pump 522.

Figure 6:
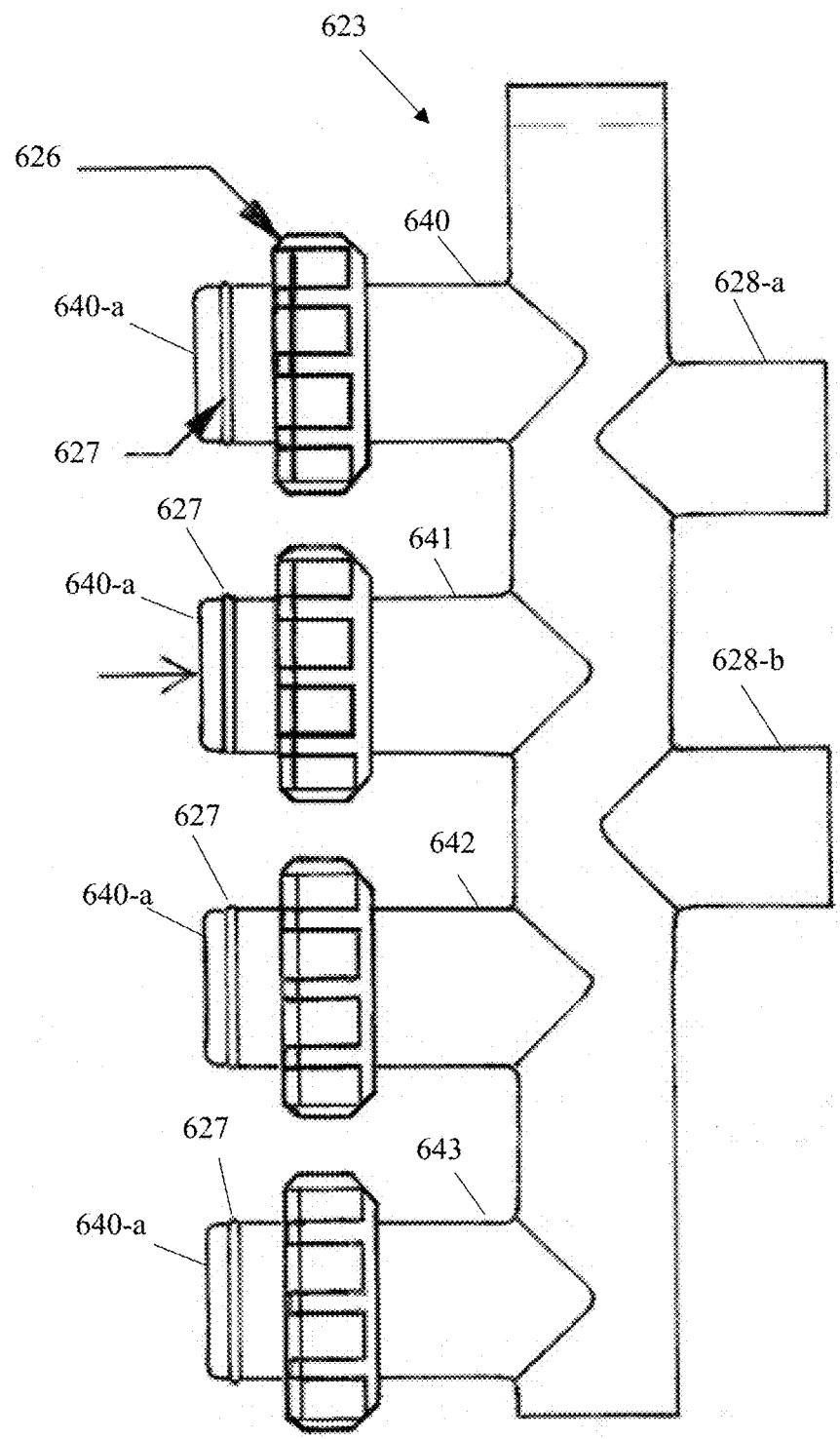
FIG. 6 illustrates the side view of a rotor valve manifold for a smart filter system, according to an aspect.

FIG. 6 illustrates the side view of a rotor valve manifold 623 for a smart filter system, according to an aspect. The smart filter rotor valve manifold 623 may be used for the control of liquid flow to various ports of the smart filter system. The rotor valve manifold 623 may include basic ports 640, 641, 642, and 643 which may each have a filter side end 640-a. The ports 640-643 may be configured at their filter side end 640-a with unions 626 and O-rings 627, for example, to fit into or be associated with the filter side manifold (as shown in FIG. 9 as 935), or any standard ports that may be commonly used in swimming pool and spa plumbing, for example. The ports may be associated with rotary valves ("rotor valve," "rotary valve," or "valve," shown as 729 in FIGS. 7A-7B) for the opening and closing of the ports 640-643 to the flow of liquid. As examples, included ports may be for return of water or other liquid 640, routing liquid to the sprayers 641, liquid inlet 642, and waste liquid outlet 643, which may lead to the drain-sump pump (as shown in FIGS. 4A-4B and FIGS. 5A-5C). The rotor valve manifold 623 may also include a port 628-a used for returning flow to the pool, and an inlet 628-b for receiving flow from the pool. The rotor valve 623 may be constructed from ABS, PVC, or any other suitable material.

Figure 7A:
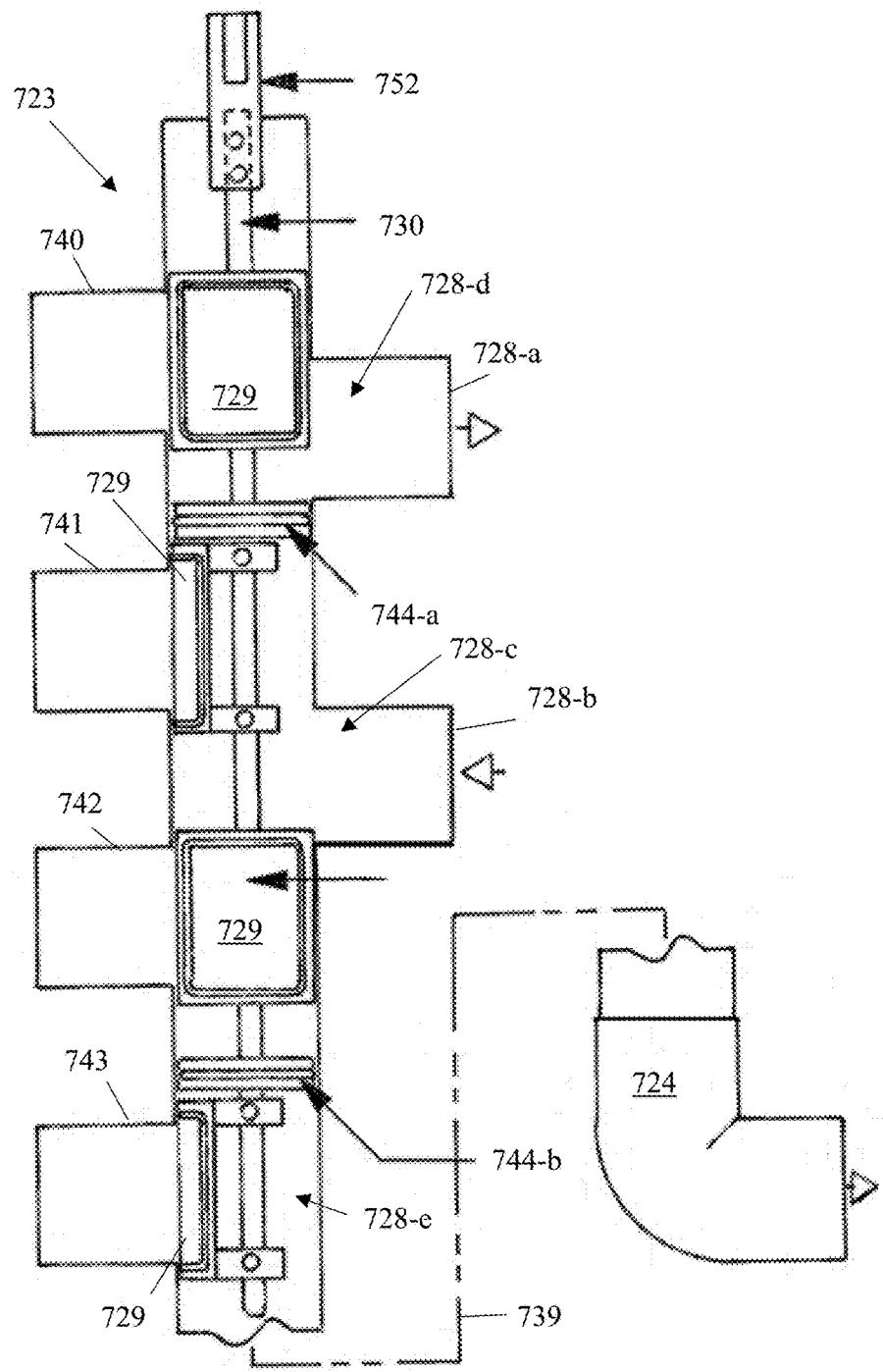
FIG. 7A illustrates the cutaway view of the smart filter system rotor valve manifold and the rotor valve manifold components, according to an aspect.

FIG. 7A illustrates the cutaway view of the smart filter system rotor valve manifold 723 and the rotor valve manifold components, according to an aspect. As an example, four rotary valves 729 at opposing 90 degree angles may be housed inside of the rotor valve manifold 723, and may be used to open and close the ports as needed. As an example, valves may be provided for the following exemplary ports: inlet-to-filter 742, return-from-filter 740, inlet-to-sprayers 741, and waste inlet 743, and all valves may be connected to a rotatable valve shaft 730. The inlet-to-filter 742 valve and the return-from-filter 740 valve may be aligned to form a first pair of valves and the inlet-to-sprayers 741 valve and the waste inlet 743 valve may be aligned to form a second pair of valves. The first and second pair of valves may be misaligned by a predetermined angle, such as, for example, 90 degrees, such that in a normal position of the rotatable valve shaft 730, the first pair of valves may be in an open state allowing flow through the inlet-to-filter 742 port and the return-from-filter 740 port while the second pair of valves may be in a closed state preventing flow through the inlet-to-sprayers 741 port and the waste inlet 743 port. As another example, a cleaning position may be obtained by rotating the rotatable valve shaft 730 by a degree amount equal to a size of the predetermined angle, such as, for example, 90 degrees, and the first pair of valves may then be in a closed state preventing flow through the inlet-to-filter 742 port and the return-from-filter 740 port while the second pair of valves may be in an open state allowing flow through the inlet-to-sprayers 741 port and the waste inlet 743 port.

Figure 7B:
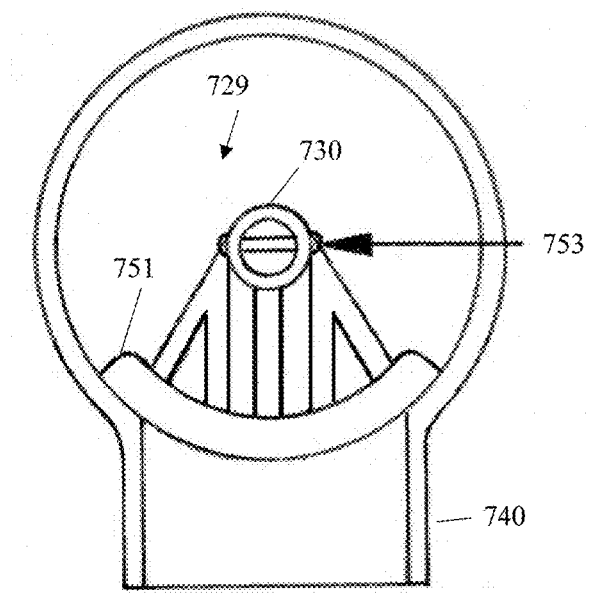
FIG. 7B illustrates the top cutaway view of a valve of the rotor valve manifold of FIG. 7A in a closed position, according to an aspect.

FIG. 7B illustrates the top cutaway view of a valve 729 of the rotor valve manifold of FIG. 7A in a closed position, according to an aspect. As an example, the detailed top view of a rotor valve 729 is shown, having a rotating plug 751 in a closed position which may stop the flow of liquid into the associated port 740. Each port of the rotor valve manifold may act as a rotor valve housing. The rotor valve manifold 723 may include a continuous rotatable valve shaft 730 within the body for rotating or turning the rotor valves 729, with which a valve body coupling 752 may be associated at the top end of the rotor valve manifold 723. The valve body coupling 752 may couple the continuous shaft 730 with a valve body (shown in FIG. 8 as 850). The valve 729 may also include a shaft fastener 753 such that each rotating plug 751 is associated with the rotor valve inner continuous shaft 730, and the rotating plug 751 rotates around the shaft 730 axis. The valve may be rotated into the closed position, again, to close the port and shut off water flow through the port. In the opposite position, the valve may rotate 90 degrees in either direction, or any other suitable predetermined angle, to open the port and allow water flow through the port 740.

As an example, certain ports may be opened or closed to run a normal pool and spa filtering operation, and the ports may be in a different opened or closed configuration to run a cleaning cycle operation. The configuration of the ports may direct water flow to the proper components of the smart filter system. A top seal ("first seal") with a center O-ring 744-*a* and bottom seal ("second seal") with a center O-ring 744-*b* may be used to separate sections of the rotor valve manifold 723, which may help to prevent cross-flow between normal filtering mode and cleaning cycle mode.

Normal Pool Operation (Filter Mode, or Filter Operation)

As an example, the swimming pool and spa water flow may use a normal filtering operation, as its default setting, as shown by the configuration in FIG. 7A. The rotor valve manifold 723 may use the following exemplary configuration of the valves for normal pool operation or mode, also referred to as filter operation or filter mode: "return from filter body" port 740 opened, "sprayers" port 741 closed, "inlet to filter body" port 742 opened, and "drain pump" port 743 closed. During normal operation, water from the swimming pool or spa that needs to be filtered may enter the filter body that houses a filter array through the inlet from pool port 728-*b* of the rotor valve manifold 723. The water may flow into the middle interior space 728-*c*, defined by seals 744-*a* and 744-*b*. During normal operation, only the inlet to the filter body port 742 may allow water flow from the interior space 728-*c*. Thus, water may enter the filter body through inlet to the filter body port 742 and may be filtered within the filter body. Next, clean, filtered water may return to the pool via the rotor valve manifold 723. During normal mode, the return from filter body port 740 may be opened to allow clean, filtered water into the rotor valve manifold 723, into the top interior space 728-*d*. The top seal 744-*a* may prevent clean, filtered water from mixing with the dirty water entering into the middle interior space 728-*c*. The clean water may then return to the pool or spa through the return to spa port 728-*a*. During normal mode, the port to the sprayers 741 and the port to the drain sump pump 743 may be closed, as shown.

Cleaning Operation (Filter Mode)

As an example, the swimming pool and spa water flow may initiate a cleaning operation, when prompted by a predetermined setting, or when a user manually begins the cleaning mode, with the following exemplary configuration of the valves: "return from filter body" port 740 closed, "inlet to sprayers" port 741 opened, "inlet to filter body" port 742 closed, and "drain sump pump" port 743 opened. The rotor valves 729 may turn 90 degrees from the positions shown in FIG. 7A in order to switch from normal mode to cleaning mode. Water from the pool may be used to clean the filter array of the swimming pool or spa, and may enter the rotor valve manifold 723 through the inlet from pool port 728-*b*. A port 741 directing water within the middle interior space 728-*c* to the sprayers may be open during the cleaning mode. Water may then flow through port 741 and into the spray manifold (as shown by 902 in FIG. 9) and may be sprayed onto the filter array to clean the filters. After cleaning the filters, the water may become dirty, and may need to be removed from the swimming pool or spa system. The waste water within the filter body may be pumped out by the drain sump pump, and may be directed into a waste drain elbow 724, by re-entering the rotor valve manifold 723 through the drain sump pump port 743. The dirty waste water in the lower interior space 728-*e* may be prevented from mixing with the clean water in the middle interior space 728-*c* by the bottom seal 744-*b*. Next, the dirty waste water may flow into waste drain elbow 724 or any other suitable pipe fitting.

The waste drain elbow 724 may be installed in the bottom end of the smart filter rotor valve manifold 723 for receiving waste water through plumbing represented by 739, which may be connected to the rotor valve manifold 723 or be integrated with the rotor valve manifold, and may be used for the routing of waste water away and into the sewer, for example.

Figure 8:
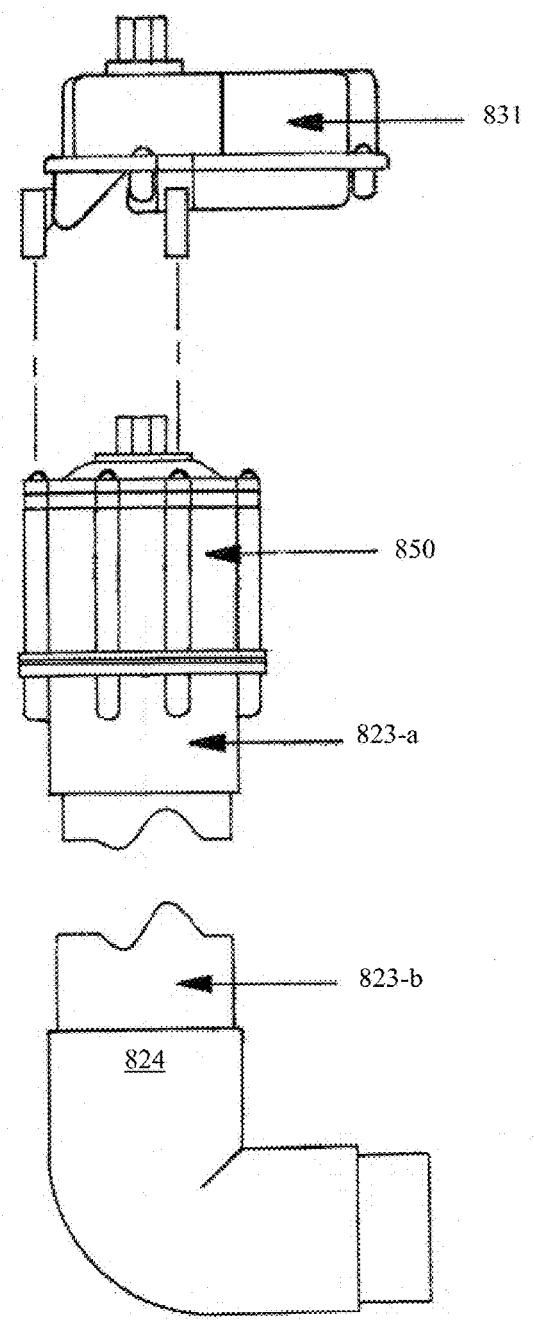
FIG. 8 illustrates the partial exploded view of a valve actuator, valve body, and the rotor valve manifold, according to an aspect.

FIG. 8 illustrates the partial exploded view of a valve actuator 831, valve body 850, and the rotor valve manifold, according to an aspect. The rotor valve manifold is represented by a partial view of the top portion 823-*a* and bottom portion 823-*b* only for visual clarity. A valve actuator 831 may be provided, and may be configured to be associated with the top end of the rotor valve body 850. The coupling of the valve body 850 to the valve actuator 831 may allow for an association between the valve actuator 831 and the rotary valves (729 in FIGS. 7A-7B), such that the valve actuator 831 may be used for the closing and opening of the rotary valves (729 in FIGS. 7A-7B) within the rotor valve manifold. The valve body may be provided with no ports, and may act as a coupling between the actuator and valves. As an example, the valve actuator 831 may be 24 volt AC. As shown, the waste elbow 824 at the bottom end of the rotor valve manifold 823-*a* may be used to route waste water to the sewer during the draining and cleaning cycle.

FIG. 9 illustrates the exploded view of the smart filter system for cleaning a filter array 903 of a liquid circulation system, according to an aspect. As an example, the smart filter system may include the following components. A motor (as shown in FIG. 2A) may be housed in an enclosure 907 mounted to the top of a filter body cover 921-*a*. The motor may then be associated with a coupling 909-*a* and a bearing with a shaft seal 909, inside of the filter body cover 921-*a*. The bearing with a shaft seal 909 may be associated with a drive shaft 908, which may be turned by the motor, and turning a gear array 911 associated with the drive shaft 908 by a coupling 910. The filter array 903, which may be housed in a filter body 921, may be held by a top filter holder 916 and a bottom filter holder 916-*a*. The turning of the gear array 911 may turn the top filter holder 916 and the bottom filter holder 916-*a*, thus, turning the filter array 903 and exposing all sides of each filter cartridge to the spray of cleaning water from sprayers 901 on a spray manifold 902. The spray manifold 902 may include a plurality of vertical spray conduits disposed between the filter body 921 and the filter array 902. As an example, the spray manifold 902 may include two spray conduits 902-*a* and 902-*b*, and the sprayers 901 along each conduit may be arranged in a staggered configuration. The sprayers 901 on the spray manifold 902 may be arranged such that they are disposed inside of the filter body 921 lengthwise about the filter cartridges 903-*a*-903-*d*. The spray manifold may receive water from the rotor valve manifold 923 through inlet 941-*a*, to direct water out through the sprayers 901.

The filter body 921 may include a filter side manifold 935 to receive the ports 940, 943 of a rotor valve manifold 923. The rotor valve manifold 923 may be associated with a valve body 950 and a valve actuator 931, which may detect pressure changes within the filter body 921 or receive input from a transducer. The rotor valve manifold 923 may include a port for the inlet of water 928-b from the pool or spa, and may also include a port for returning water 928-a to the pool or spa. The smart filter system may be configured to begin a cleaning process, wherein the valve actuator 931 opens or closes the rotary valves of the system to route liquid such as water to the proper ports and components.

Figure 10A:
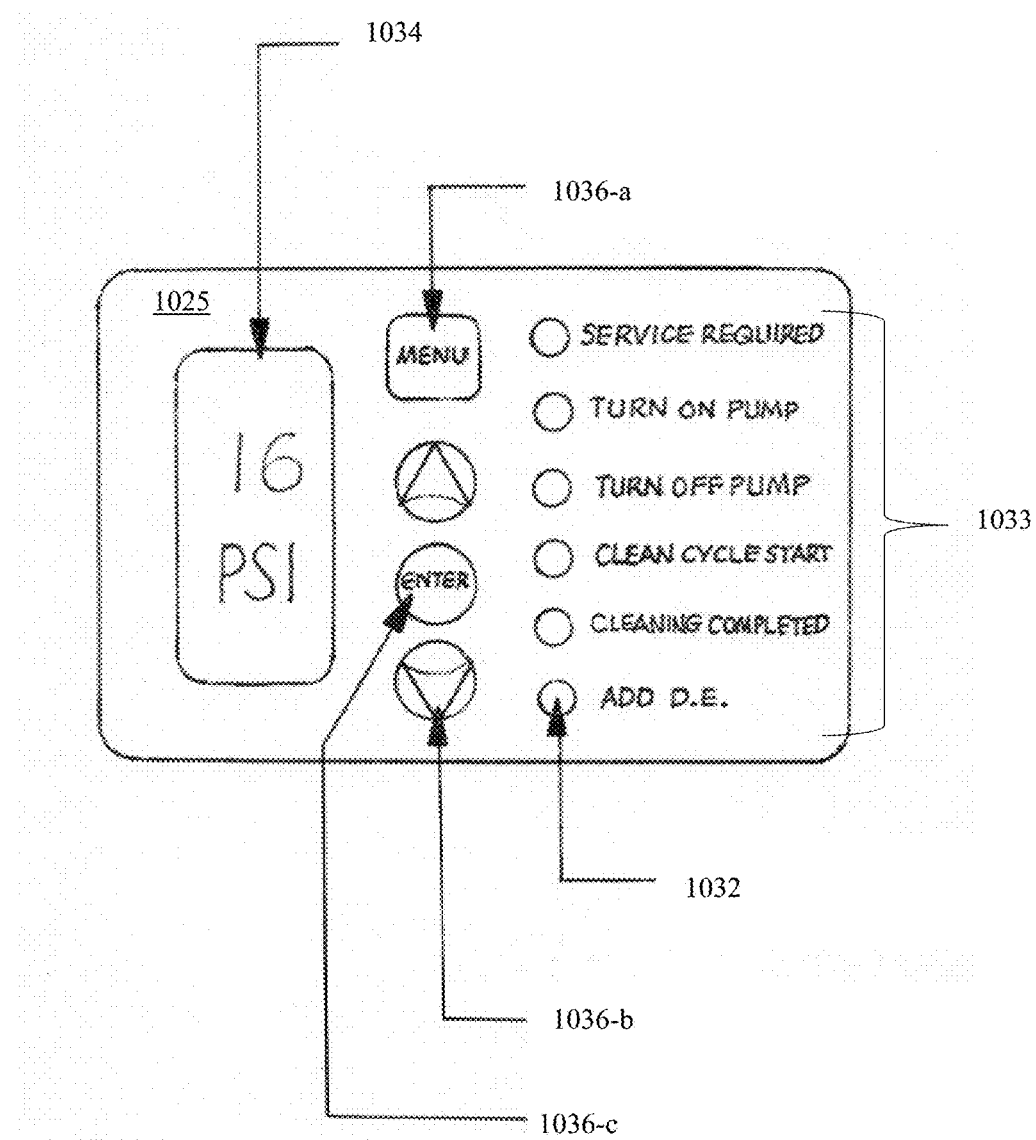
FIG. 10A illustrates an example of a control panel that may be used with the smart filter, according to an aspect.

The smart filter system may, for example, be used to perform the following exemplary operation process. First, the pool pump may be in a normal pool circulation mode, or normal operation mode, which may be a normal filtering mode, as described when referring to FIGS. 7A-7B. The pool circulation may be on with the pool pump on and flow being directing to the filter inlet port, for routine filtering of the circulation system's liquid. The flow of liquid is routed through the filter grids, is filtered, and then returns to the pool through the return port of the rotor valve manifold 923. A cleaning/service required prompt is initiated when the filter pressure exceeds 10 PSI over the normal range of, for example, 10-30 PSI, which may depend on the size and model of components used in the filter system. The cartridge or D.E. filters are also monitored and the statuses are displayed on the control panel (as shown in FIG. 10A) via a pressure transducer, mounted at the inlet port plumbing (as shown in FIG. 2C). Next, a cleaning mode may be initiated, as described when referring to FIGS. 7A-7B. When the cleaning mode is initiated, the pool pump may be turned off. The user presses a start button or other actuation means to run the cleaning mode, or the cleaning mode is initiated automatically. The drain-sump pump starts, and the filter body water drains through the drain-sump pump port for one minute. After one minute, the smart filter rotor valve rotates 90 degrees. An exemplary sequence for the valve when in cleaning mode may be: "return" closes, "sprayers" open, "inlet" closes, and "drain pump" opens. The pool pump is then turned on. The sprayers are then on, and clean the filter grid or grids. The DC motor turns the gear shaft, and the quad filter system is turning at 4 RPM, such that each filter is turning. The cleaning process may take approximately four minutes, or approximately eight minutes for D.E. filters or cartridge filters, and may vary according to the size and models of components used. Next, after the cleaning mode is completed, the system returns to the normal filtering operation. The smart filter rotor valve rotates 90 degrees. An exemplary sequence for the valve when returning to normal operation mode may be: "return" opens, "sprayers" close, "inlet" opens, and "drain pump" closes. The DC filter rotation motor stops, the drain-sump pump stops, and the pool pump is turned on and resumes normal pool circulation operation.

FIG. 10A illustrates an example of a control panel 1025 that may be used with the smart filter, according to an aspect. A control panel 1025 may be used for a control module of the smart filter system, and may be included with a control panel housing, which may house electrical conduits used for the smart filter system. As an example, various alerts 1033 may be provided on the control panel 1025, such as "Service required," "Turn on pump," "Turn off pump," "Clean cycle start"/"Clean cycle started," "Cleaning complete"/"Cleaning completed," "Add DE", or any other suitable alerts or notices. LEDs 1032 may be used with the alerts or notices. As an example, a message display 1034 may be provided, and the display may default to showing the PSI of the filter body. The message display 1034 may also display other parameters or settings. Parameters may be set with a menu button 1036-a and up/down buttons 1036-b, or any other suitable means, such as knobs. An enter button 1036-c may also be provided for entering commands or settings. As an example, the user may set the PSI at 10 PSI above the normal operating range, or to set low PSI at 5 PSI, and at these ranges the "service required" LED may illuminate and the display screen may prompt the user to clean the basket, as a basket full of debris may lower the filter body pressure. Other alert systems may also be used to alert the user that similar maintenance or service is needed, and other controls may be provided for the user to change settings or control the smart filter system.

Figure 10B:
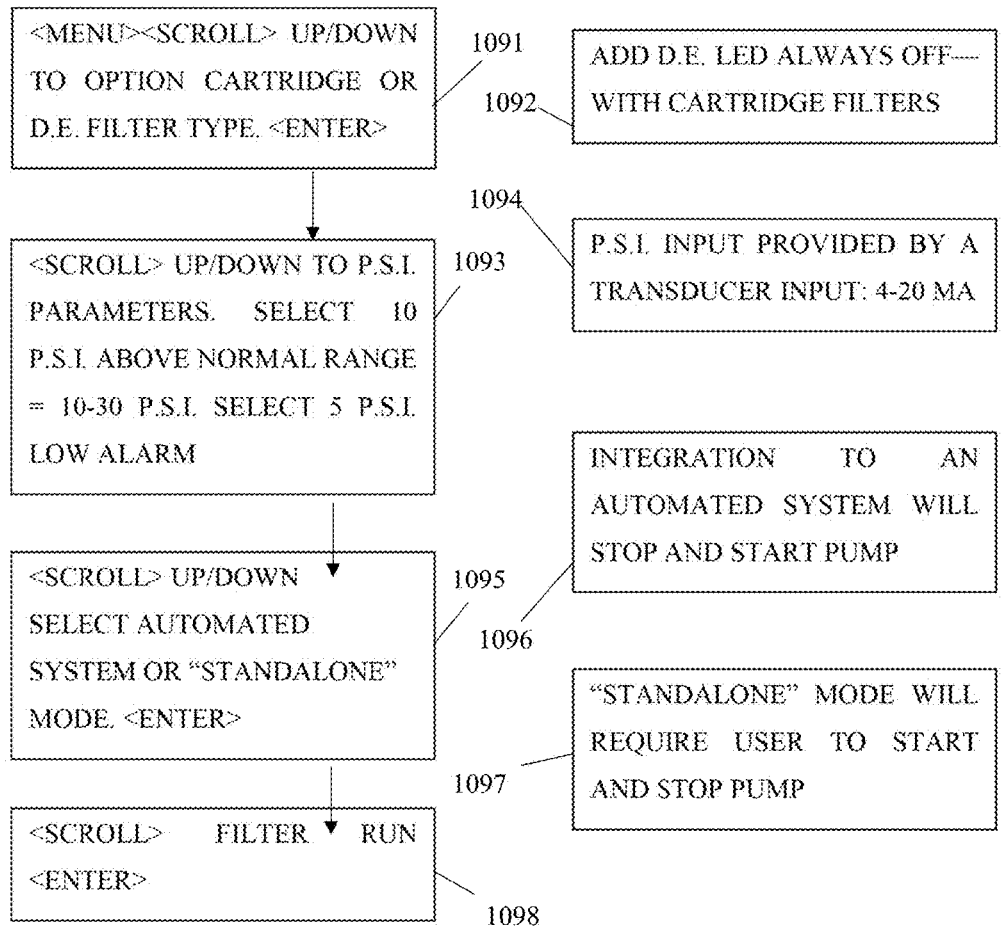
FIG. 10B illustrates a flow chart depicting the exemplary steps of setting up or customizing a smart filter system, according to an aspect.

FIG. 10B illustrates a flow chart depicting the exemplary steps of setting up or customizing a smart filter system, according to an aspect. As shown, the smart filter system may provide several system settings, parameters, and controls that may be customized by the user. The various functions of the smart filter system may be actuated by a user by, for example, a control panel such as in FIG. 10A, or by software. The software may be run through, for example, a smartphone application ("smartphone application" or "smartphone app") or similar device, and may communicate with the smart filter system through the internet. A user may use menu and scroll buttons to make selections, for example, either on a control panel or through a similar interface provided by a smartphone app.

First, the user may select the type of filter used in their swimming pool or spa system, such as D.E. or cartridge filters (step 1091). If set to D.E. type, the system may be set to illuminate an LED on a control panel, or send an alert through the smartphone app when the swimming pool or spa system needs D.E. to be added after the cleaning cycle is complete (as indicated by 1092). Thus, in an example, in a D. E. filter system, the LED may be configured to illuminate as a reminder. The LED may stay illuminated until D. E. is added by the user. Preferably, in all cases, the "add D. E." indicator shall stay illuminated until it is reset via the menu mode, thus now allowing the pool/spa filtering cycle to be started by the end user or automated system without first adding the D.E. This may be set to always be off in the case of a user setting their smart filter system to using cartridge filters. Next, the user may also input pressure parameters for the system, such that a certain range PSI is designated as the normal range (step 1093). As an example, the normal pressure range may be 10-30 PSI. The user may also select a certain PSI level, such as 5 PSI, at which a low pressure alarm or alert is sent to the user. The PSI within the filter body may be input to a transducer, and the input may be, for example, 4-20 mA (as indicated by 1094). Next, the user may choose whether the smart filter system runs in an automated mode or a standalone mode (step 1095). An automated system may turn the swimming pool or spa pump on or off according to the system settings (as indicated by 1096), and a standalone mode may require the user to start and stop the pump (as indicated by 1097). Next, the user may begin normal pool operation, which may also be designated as "filter run," for example, to indicate a normal filtering process (step 1098). The smart filter system may, as a default mode, run in the normal pool operation, filtering the pool or spa water continuously.

Figure 11A:
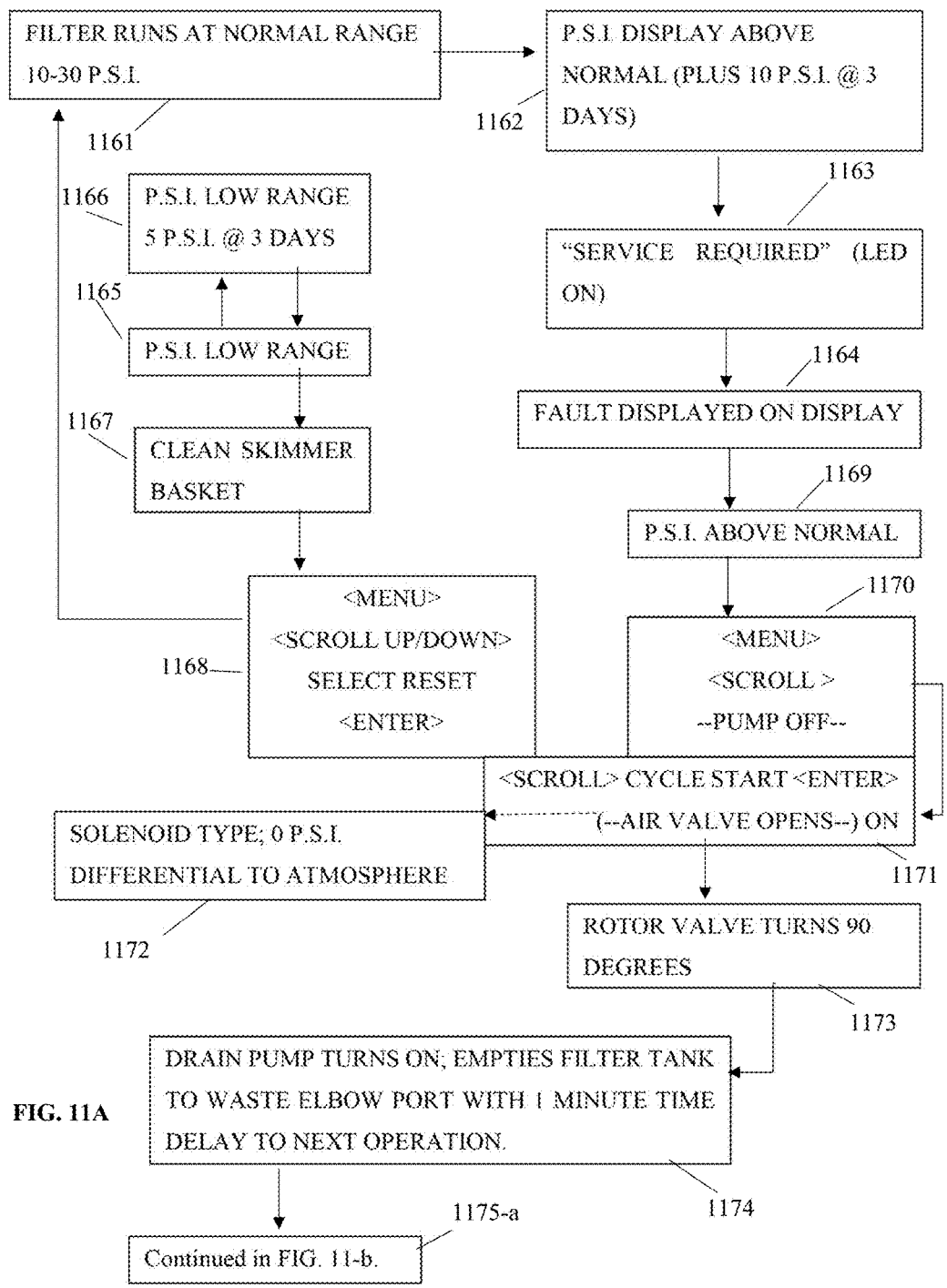
FIG. 11A illustrates a first flow chart depicting the exemplary steps of the operation of a self-cleaning smart filter system, according to an aspect.

FIG. 11A illustrates a first flow chart depicting the exemplary steps of the operation of a self-cleaning smart filter system, according to an aspect. The exemplary steps may also depict the programming of an automated system used for a smart filter of a swimming pool or spa. The flow charts illustrated in FIGS. 11A-11B may be used in part or as a whole to construct or build a control module either in a software form, e.g. an app on a smartphone, or any other similar mobile device, or in a hardware form, e.g. an electrical circuit that could be housed in a control panel housing.

The system filter may under normal conditions be running at a normal range of, for example, 10-30 PSI (step 1161). Then, during normal operation, if the pressure is above or below the normal range, the system control panel may display an alert (step 1162). As an example, the smart filter system may be set such that an alert is displayed if high pressure above the normal range or low pressure below the normal range is sustained for three days. Next, the control panel may display a notice to the user that service is required, such as by turning on an LED (step 1163). The exact nature of the service required may also be shown on the display (step 1164) such that the user knows what action to take to solve the problem. If the pressure is too low in the filter body (step 1165), the smart filter system may monitor the pressure and display an alert if the low pressure has been sustained for three days (step 1166). As an example, a low pressure alert may be triggered if the filter body is at 5 PSI. If the low pressure continues (step 1166), the alert may continue to be displayed (step 1165). The user may then be instructed to clean the skimmer basket to solve the issue (step 1167). Next, the user may program the smart filter system to be reset (step 1168). This may be actuated through, for example, a control panel connected directly to the system, or through a smartphone application or similar application communicating with the smart filter system through the internet, or may be performed automatically by the smart filter system. The smart filter system may then resume normal operation (step 1161) and continue to monitor the filter body pressure.

If the smart filter system detects high pressure above the normal range (step 1169), the user may turn the swimming pool or spa pump off (step 1170) to initiate the cleaning cycle, if the smart filter system is in "standalone" mode (as described when referring to 1097 of FIG. 10B. This may be done, again, either through a control panel connected directly to the system, or through a smartphone application or similar application communicating with the smart filter system through the Internet If, for example, the smart filter system is in an automated mode, as described when referring to 1096 of FIG. 10B, user interaction at step 1170 may not be necessary, and the pump may be turned off automatically by the smart filter system. It should be understood that in all steps of the exemplary process depicted in FIGS. 11A-11B, user interaction may not be needed if the smart filter system is in an automated mode, while user interaction may be necessary if the smart filter system is in a standalone mode.

Initiation of the cleaning cycle may be done, for example, by using buttons on the control panel to scroll to "Cycle Start" and pressing "Enter," or by following similar commands through a smartphone app (step 1171). When the cleaning cycle is begun, the smart filter system may open an air valve connected to a solenoid valve (step 1172) to allow flow of air out into the atmosphere, such that the pressure inside of the filter body during the cleaning cycle is equalized with the atmospheric pressure. Next, a motor ("second motor") may be actuated in order to turn the rotatable valve shaft (as shown by 730 in FIGS. 7A-7B), such that the rotor valves of the system may be turned from the normal position to the cleaning position and to open and close the appropriate ports for the cleaning cycle (step 1173). The drain pump may be turned on by the system to empty the filter body or tank to a waste elbow port during the cleaning cycle. A time delay may be included into the smart filter system programming such that, for example, there is a one minute delay between switching cycles ensuring that all waste water is removed from the filter body before normal operation is resumed and that clean and unfiltered water does not mix within the rotor valve manifold, or that all water inside of the filter body is removed before the filter cleaning cycle is initiated (step 1174). The next exemplary steps in the operation of the self-cleaning smart filter system is further described when referring to FIG. 11B (as indicated by box 1175-*a*).

Figure 11B:
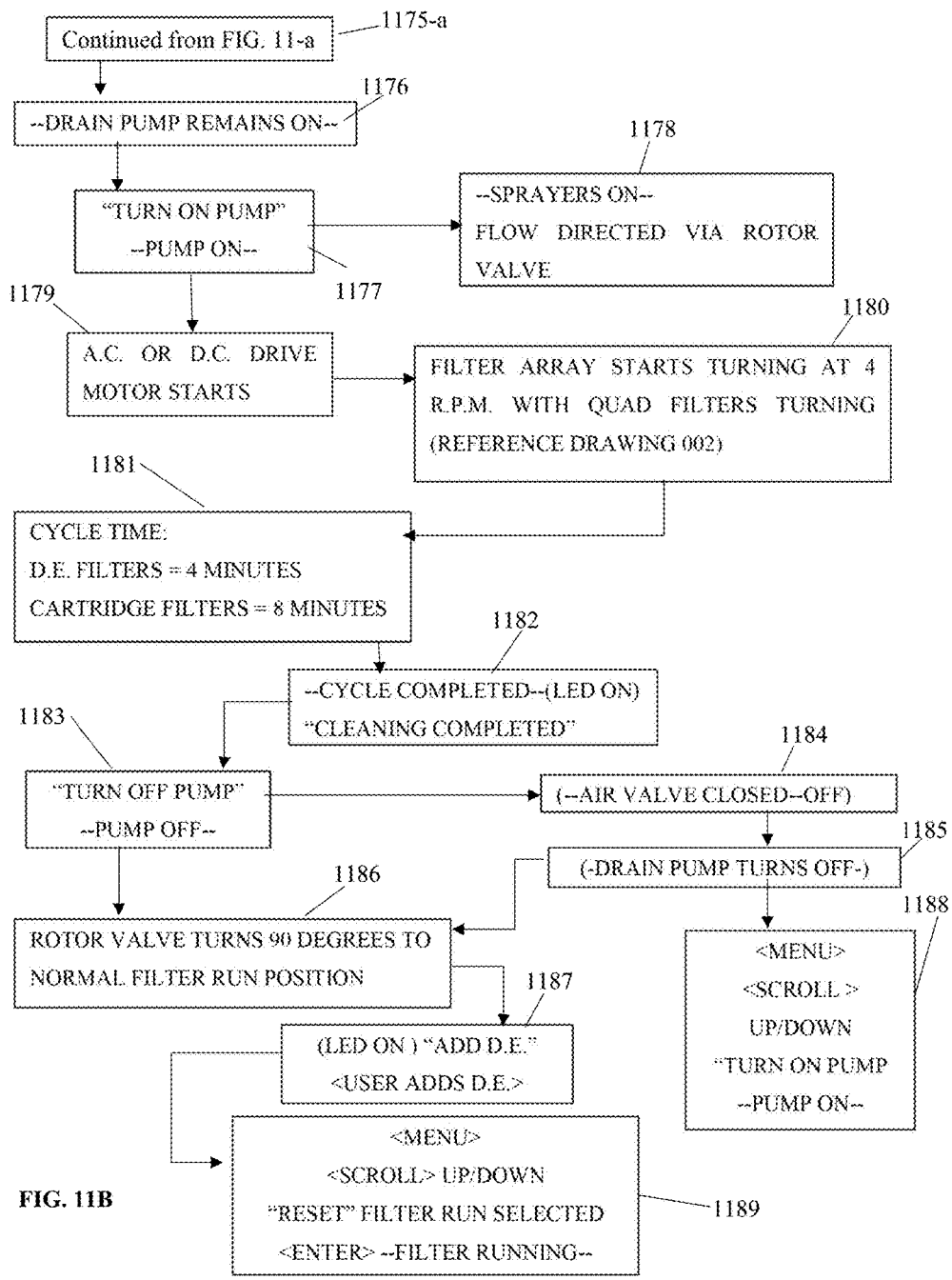
FIG. 11B illustrates a second flow chart depicting the exemplary steps of the operation of a self-cleaning smart filter system, according to an aspect.

FIG. 11B illustrates a second flow chart depicting the exemplary steps of the operation of a self-cleaning smart filter system, according to an aspect. The exemplary steps shown in FIG. 11B may be continued from the flow chart illustrated in FIG. 11A, as indicated by box 1175-*b*. Once the cleaning cycle has begun, the drain pump may remain on throughout the process (step 1176). Next, the pump may be turned back on, either through an automated process by the system or by the user actuating the pump through a control panel or smartphone application (step 1177). Then, water may be directed via the rotor valve towards the sprayers of the spray manifold (step 1178), such that the filter cartridges of the swimming pool or spa are sprayed clean. At the same time, the drive motor ("first motor"), which may be an AC or DC drive motor, may be started by the smart filter system (step 1179). The motor may then turn the entire filter array at, for example, 4 RPM. Each individual filter cartridge may also rotate, as the entire filter array itself turns (step 1180). The filter cleaning cycle may continue to run, for a preset amount of time according to the type of filters being cleaned (step 1181). As an example, if the user has a swimming pool or spa system with D.E. filters, the cleaning cycle may be set for four minutes. If the user's system has cartridge filters, the cleaning cycle may be set for eight minutes. Upon completion of the cleaning process, the smart filter system may display an alert to the user that the cycle has been completed (step 1182), either through a display on the smart filter system itself, such as turning on an LED on a control panel, or through an alert delivered through the internet, such as through a smartphone application. Next, the system may direct the user to turn off the pump, or the pump may be automatically turned off by the system, thus also turning off the sprayers (step 1183). Next, the air valve may be closed (step 1184) and the drain pump may be turned off (step 1185), which may be done automatically by the smart filter system. At the same time, the second motor may be actuated in order to turn the rotatable valve shaft, and may turn the rotor valves from the cleaning position to the normal position, such that the appropriate ports are opened and closed for returning the swimming pool or spa system to normal operation mode (step 1186). Next, the user may use the control panel or smartphone application to turn the swimming pool or spa pump back on (step 1188). Normal operation may then resume.

If, after the cleaning cycle, the smart filter system detects that the swimming pool or spa system is in need of more D.E., an alert may be displayed to the user on the control panel or through a smartphone application (step 1187). After resolving the issue, the user may reset the system, either by scrolling through the control panel menu or a smartphone application (step 1189). Normal operation may then resume after the reset.

It may be advantageous to set forth definitions of certain words and phrases used in this patent document. The term "couple" and its derivatives refer to any direct or indirect communication between two or more elements, whether or not those elements are in physical contact with one another.

The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

The invention claimed is:

1. A self-cleaning pool or spa filter system comprising:
    a filter including a filter body housing a first set of filter cartridges, each filter cartridge having a length and a circumference, each filter cartridge being rotatably connected to a filter holder via a filter mount;
    a spray manifold having an inlet for receiving water from a pool or spa pump and a plurality of sprayers being disposed inside the filter body lengthwise about the first set filter cartridges;
    a first shaft connected to the filter holder, the first shaft being also connected to a first motor, which when actuated, can rotate the first shaft and thus the filter holder, causing the first set of filter cartridges to rotate about the first shaft, thus exposing successively lengthwise each filter cartridge of the first set to the plurality of sprayers;
    a sun gear attached to the first shaft; and
    a second set of planet gears, each planet gear being concentrically associated with one filter cartridge and being engaged by the sun gear, such that to cause transfer of a rotational movement of the sun gear simultaneously to each planet gear of the second set and thus to each filter cartridge, causing each filter cartridge to rotate about own filter mount, for exposing the entire circumference of each filter cartridge of the first set to the plurality of sprayers during the first shaft's rotation.

2. The self-cleaning filter system of claim 1 further comprising a drain pump being connected to a bottom of the filter body and to a sewer line and being configured to start after a first time delay after the plurality of sprayers start running, to pump dirty water from the bottom of the filter body into the sewer line at a rate that prevents submersion of the filter cartridges into the dirty water, and to stop after a second time delay after the plurality of sprayers stop running to substantially empty the filter body of dirty water.

3. The self-cleaning filter system of claim 2 further comprising a rotor valve manifold including a rotor valve housing having an inlet-from-pool port, a return-to-pool port, an inlet-to-filter port, a return-from-filter port, an inlet-to-sprayers port, a waste inlet port and a waste drain port.

4. The self-cleaning filter system of claim 3 further comprising a rotor valve housed inside the rotor valve housing and comprising:
    a rotatable valve shaft; and
    an inlet-to-filter valve, a return-from-filter valve, an inlet-to-sprayers valve and a waste inlet valve, all connected to the rotatable valve shaft, wherein the inlet-to-filter valve and the return-from-filter valve are aligned to form a first pair of valves and wherein the inlet-to-sprayers valve and the waste inlet valve are aligned to form a second pair of valves, the first and the second pair of valves being misaligned by a predetermined angle, such that in a normal position of the rotatable valve shaft the first pair of valves is in an open state allowing flow through the inlet-to-filter port and the return-from-filter port while the second pair of valves is in a closed state preventing flow through the inlet-to-sprayers port and the waste inlet port, and, in a cleaning position obtained by rotating the rotatable valve shaft by a degree amount equal to a size of the predetermined angle, the first pair of valves is in a closed state preventing flow through the inlet-to-filter port and the return-from-filter port while the second pair of valves is in an open state allowing flow through the inlet-to-sprayers port and the waste inlet port.

5. The self-cleaning filter system of claim 4 wherein the predetermined angle's size is 90 degrees.

6. The self-cleaning filter system of claim 5 wherein the rotor valve housing comprises a first seal disposed between the inlet-from-pool port and the return-from-filter port to prevent mixing of pool water entering the rotor valve housing with filtered water coming from the filter and a second seal disposed between the inlet-from-pool port and the waste inlet port to prevent mixing of pool water entering the rotor valve housing with waste water coming from the drain pump.

7. The self-cleaning filter system of claim 6 having four filter cartridges.

8. The self-cleaning filter system of claim 7 wherein the set of filter cartridges is arranged vertically and wherein the filter holder is disposed at a top end of the set of filter cartridges.

9. The self-cleaning filter system of claim 8 wherein the spray manifold comprises a first and a second vertical sprayer conduit disposed between the filter body and the first set of filter cartridges, the plurality of sprayers being arranged in a staggered configuration.

10. The self-cleaning filter system of claim 9 wherein the plurality of sprayers are high pressure sprayers having vertical V-shaped spray pattern.

11. A self-cleaning pool or spa filter system comprising:
a filter including a filter body housing a first set of filter cartridges, each filter cartridge having a length and a circumference, each filter cartridge being rotatably connected to a filter holder via a filter mount;
a rotor valve manifold including a rotor valve housing having an inlet-from-pool port, a return-to-pool port, an inlet-to-filter port, a return-from-filter port, an inlet-to-sprayers port, a waste inlet port and a waste drain port;
a rotor valve housed inside the rotor valve housing and comprising:
a rotatable valve shaft; and
an inlet-to-filter valve, a return-from-filter valve, an inlet-to-sprayers valve and a waste inlet valve, all connected to the rotatable valve shaft, wherein the inlet-to-filter valve and the return-from-filter valve are aligned to form a first pair of valves and wherein the inlet-to-sprayers valve and the waste inlet valve are aligned to form a second pair of valves, the first and the second pair of valves being misaligned by a predetermined angle, such that in a normal position of the rotatable valve shaft the first pair of valves is in an open state allowing flow through the inlet-to-filter port and the return-from-filter port while the second pair of valves is in a closed state preventing flow through the inlet-to-sprayers port and the waste inlet port, and, in a cleaning position obtained by rotating the rotatable valve shaft by a degree amount equal to a size of the predetermined angle, the first pair of valves is in a closed state preventing flow through the inlet-to-filter port and the return-from-filter port while the second pair of valves is in an open state allowing flow through the inlet-to-sprayers port and the waste inlet port.

12. The self-cleaning filter system of claim 11 further comprising:
a spray manifold having an inlet for receiving water from a pool or spa pump and a plurality of sprayers being disposed inside the filter body lengthwise about the first set filter cartridges;
a first shaft connected to the filter holder, the first shaft being also connected to a first motor, which when actuated, can rotate the first shaft and thus the filter holder, causing the first set of filter cartridges to rotate about the first shaft, thus exposing successively lengthwise each filter cartridge of the first set to the plurality of sprayers;
a sun gear attached to the first shaft; and
a second set of planet gears, each planet gear being engaged by the sun gear, such that to cause transfer of a rotational movement of the sun gear simultaneously to each planet gear of the second set and thus to each filter cartridge, causing each filter cartridge to rotate about own filter mount, for exposing the entire circumference of each filter cartridge of the first set to the plurality of sprayers during the first shaft's rotation.

13. The self-cleaning filter system of claim 12 further comprising a drain pump being connected to a bottom of the filter body and to a sewer line and being configured to start after a first time delay after the plurality of sprayers start running, to pump dirty water from the bottom of the filter body into the sewer line at a rate that prevents submersion of the filter cartridges into the dirty water, and to stop after a second time delay after the plurality of sprayers stop running to substantially empty the filter body of dirty water.

14. The self-cleaning filter system of claim 11 wherein the rotor valve housing comprises a first seal disposed between the inlet-from-pool port and the return-from-filter port to prevent mixing of pool water entering the rotor valve housing with filtered water coming from the filter and a second seal disposed between the inlet-from-pool port and the waste inlet port to prevent mixing of pool water entering the rotor valve housing with waste water coming from the drain pump.

15. The self-cleaning filter system of claim 13 further comprising a control module configured to automate a cleaning process comprising the steps of:
opening a solenoid valve mounted on the filter body to equalize a pressure inside the filter with atmospheric pressure;
actuating a second motor to turn the rotatable valve shaft from the normal position to the cleaning position;
starting the drain pump;
starting the pool or spa pump, and thus the plurality of sprayers;
actuating the first motor to rotate the first shaft and thus the first set of filter cartridges and each filter cartridge;
after a preset time, turning off the pool or spa pump, and thus the plurality of sprayers;
closing the solenoid valve;
turning off the drain pump; and
actuating the second motor to turn the rotatable valve shaft from the cleaning position to the normal position.

16. The self-cleaning filter system of claim 11 wherein the set of filter cartridges is arranged vertically and wherein the filter holder is disposed at a top end of the set of filter cartridges.

17. The self-cleaning filter system of claim 12 wherein the spray manifold comprises a first and a second vertical sprayer conduit disposed between the filter body and the first set of filter cartridges, the plurality of sprayers being arranged in a staggered configuration.

18. A rotor valve housed inside a rotor valve housing of a rotor valve manifold having an inlet-from-pool port, a return-to-pool port, an inlet-to-filter port, a return-from-filter port, an inlet-to-sprayers port, a waste inlet port and a waste drain port, the rotor valve comprising:

a rotatable valve shaft; and an inlet-to-filter valve, a return-from-filter valve, an inlet-to-sprayers valve and a waste inlet valve, all connected to the rotatable valve shaft, wherein the inlet-to-filter valve and the return-from-filter valve are aligned to form a first pair of valves and wherein the inlet-to-sprayers valve and the waste inlet valve are aligned to form a second pair of valves, the first and the second pair of valves being misaligned by a predetermined angle, such that in a normal position of the rotatable valve shaft the first pair of valves is in an open state allowing flow through the inlet-to-filter port and the return-from-filter port while the second pair of valves is in a closed state preventing flow through the inlet-to-sprayers port and the waste inlet port, and, in a cleaning position obtained by rotating the rotatable valve shaft by a degree amount equal to a size of the predetermined angle, the first pair of valves is in a closed state preventing flow through the inlet-to-filter port and the return-from-filter port while the second pair of valves is in an open state allowing flow through the inlet-to-sprayers port and the waste inlet port.

19. The rotor valve of claim 18 wherein the predetermined angle's size is 90 degrees.

20. The rotor valve of claim 19 further comprising a second motor coupled to the rotatable valve shaft, the second motor being configured to rotate the rotatable valve shaft by 90 degrees from the normal position to the cleaning position and vice versa.

* * * * *